United States Patent
Hossain et al.

(10) Patent No.: US 12,453,802 B1
(45) Date of Patent: *Oct. 28, 2025

(54) ORGANIC DENTAL GUM AND METHOD OF FABRICATING THE DENTAL GUM

(71) Applicant: IMAM MOHAMMAD IBN SAUD ISLAMIC UNIVERSITY, Riyadh (SA)

(72) Inventors: Abm Sharif Hossain, Riyadh (SA); Hassan Ahmed Rudayni, Riyadh (SA); Mohammad Saad Aleissa, Riyadh (SA); Abdullah Sultan Ali Alawam, Riyadh (SA); Mohammed Musa Zahrany, Riyadh (SA); Fazliny Abdul Rahman, Kuala Lumpur (MY)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 19/037,073

(22) Filed: Jan. 24, 2025

(51) Int. Cl.
| | |
|---|---|
| *A61L 27/26* | (2006.01) |
| *A61L 27/02* | (2006.01) |
| *A61L 27/18* | (2006.01) |
| *A61L 27/20* | (2006.01) |
| *A61L 27/36* | (2006.01) |

(52) U.S. Cl.
CPC ............ *A61L 27/26* (2013.01); *A61L 27/025* (2013.01); *A61L 27/18* (2013.01); *A61L 27/20* (2013.01); *A61L 27/3608* (2013.01); *A61L 27/3637* (2013.01); *A61L 27/3683* (2013.01); *A61L 27/3687* (2013.01); *A61L 2400/12* (2013.01); *A61L 2430/12* (2013.01)

(58) Field of Classification Search
None
See application file for complete search history.

(56) References Cited

U.S. PATENT DOCUMENTS

| | | |
|---|---|---|
| 6,319,510 B1 | 11/2001 | Yates |
| 9,668,831 B2 | 6/2017 | Cirronis et al. |
| 9,714,345 B2 | 7/2017 | Del Torto |
| 2019/0125632 A1 | 5/2019 | Kuriyama |

FOREIGN PATENT DOCUMENTS

| | | |
|---|---|---|
| CN | 106511102 A | 3/2017 |
| CN | 110218380 A | 9/2019 |

OTHER PUBLICATIONS

Ahmed Fouly, et al.. "Fabrication of PMMA nanocomposite biomaterials reinforced by cellulose nanocrystals extracted from rice husk for dental applications", Friction, vol. 12, Aug. 29, 2024, pp. 2808-2825.

*Primary Examiner* — David J Blanchard
*Assistant Examiner* — Daniel F Coughlin
(74) *Attorney, Agent, or Firm* — Oblon, McClelland, Maier & Neustadt, L.L.P.

(57) ABSTRACT

An organic dental gum pad formed from a moldable composition includes a nano starch-based biomaterial, including a nanocomponent, a starch biocomposite, and an organic composition. The nanocomponent includes fish bone powder, oyster shell powder, coconut shell powder, graphene, and sheep bone powder. The starch biocomposite includes date seed nano-starch, black palm seed-based nanocellulose, corn starch, and olive seed-based nano-starch, and the organic composition includes at least one of *Lannea* sp. glue, waste jackfruit latex, *Acacia nilotica* glue, a sheep gut oil-based glycerin, beetroot peel dye, dragon fruit peel dye, mangosteen dye, pomegranate peel, and aroid peel gel. The organic dental gum pad further includes at least one polymer component, and a cyanoacrylate. The moldable composition includes particles having an average particle size of less than 30 nm, and a molded structure has a thickness of 0.5 to 4 mm.

13 Claims, 10 Drawing Sheets

ORGANIC DENTAL GUM AND METHOD OF FABRICATING THE DENTAL GUM

BACKGROUND

Technical Field

The present disclosure is directed to a dental gum pad, more particularly, an organic dental gum pad derived from biocomposites, and a method of fabricating the dental gum.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The importance of sustainable biomaterials in dentistry has grown markedly in recent years, largely driven by rising environmental concerns, scarcity of resources, waste accumulation, and increasing demand for biocompatible materials. Sustainable biomaterials offer a wide array of benefits. They present an environmentally friendly alternative to traditional dental materials such as synthetic plastics and nonbiodegradable polymers, significantly reducing waste accumulation and the environmental footprint of dental practices Moreover, the biocompatibility of dental materials can directly influencing tissue response and long-term clinical outcomes by aiding in positive cellular interactions and tissue integration and minimizing the risk of adverse reactions and complications.

When used in dental gums pads, the inclusion of synthetic materials such as metals, resins, plastics, and adhesives can cause low durability, poor aesthetics, increased cost of manufacture, and complications due to a lack of biocompatibility.

Therefore, one objective of this disclosure is to provide an organic dental pad gum formed from a moldable composition which offers superior mechanical strength and biocompatibility, without negatively impacting the environment.

SUMMARY

In an exemplary embodiment, an organic dental gum pad formed from a moldable composition is described. The organic dental gum pad comprises a nanostarch-based biomaterial comprising a nanocomponent, a starch biocomposite, and an organic composition. The organic dental gum pad further comprises at least one polymer component selected from the group consisting of a polymethyl methacrylate (PMMA), a polylactic glycolic acid (PLGA), and a silicone, and a cyanoacrylate. The nanocomponent comprises fish bone powder, oyster shell powder, coconut shell powder, graphene, and sheep bone powder. The starch biocomposite comprises date seed nanoparticles, black palm seed coat nanoparticles, corn starch nanoparticles, and olive seed nanoparticles. The organic composition comprises at least one of a *Lannea* sp. glue, waste jackfruit latex, *Acacia nilotica* glue, a sheep gut oil-based glycerin, beetroot peel dye, dragon fruit peel dye, mangosteen dye, pomegranate peel, and aroid peel gel. The moldable composition comprises particles having an average particle size of 30 nanometers (nm) or less. The organic dental gum pad has a molded structure having a thickness of 0.5 to 4 millimeters (mm).

In some embodiments, the molded structure comprises a plurality of periodontal pockets arranged along a perimeter of the molded structure, the pockets having a depth of 1 to 3 mm.

In some embodiments, the polymer component is present in an amount of 1 to 20 wt. % relative to a total weight of the moldable composition.

In some embodiments, the organic composition is present in an amount of 10 to 30 wt. % relative to a total weight of the moldable composition.

In some embodiments, the beetroot peel dye and dragon fruit peel dye are present in an amount of 1 to 20 wt. % relative to a total weight of the moldable composition.

In some embodiments, the moldable composition has a tensile modulus of 0.5 to 3 GPa.

In some embodiments, the organic composition is present in an amount of 16 to 23 wt. % relative to a total weight of the moldable composition.

In some embodiments, the moldable composition comprises particles having an average particle size of 20 nm or less.

In some embodiments, the molded structure has a thickness of 1.5 to 3 mm.

In some embodiments, the moldable composition has a tensile strength of 90 to 100 mPa/kg·m$^3$.

In some embodiments, the moldable composition has a tensile modulus of 1.5 to 2 GPa.

In another embodiment, a method of fabricating the dental gum is disclosed. The method comprises hydrolyzing a mixture of the starch biocomposite, the nanocomponent, and the organic composition with at least one inorganic acid to obtain the nanostarch-based biomaterial; combining the polymer component, the cyanoacrylate, and the nanostarch-based biomaterial to form the moldable composition, then pressing the moldable composition into a molded structure; and curing the molded structure to form the dental gum pad.

In some embodiments, the inorganic acid is selected from the group consisting of hydrochloric acid, nitric acid, hydrobromic acid, sulfuric acid, hydrofluoric acid, and phosphorous acid.

In some embodiments, the method of curing is photocuring or thermal curing.

In some embodiments, the inorganic acid is sulfuric acid and nitric acid.

In some embodiments, the curing is photocuring or thermal curing.

In some embodiments, the pressing comprises pressing the moldable composition into a molded structure with a force of 1000 to 2000 psi.

In some embodiments, the curing comprises curing the molded structure with a photocuring device for 10 to 30 seconds at a light intensity of 250 to 850 mW/cm$^2$.

In some embodiments, the method of curing comprises thermally curing the molded structure at a temperature of 100 to 160° C. for 3 to 6 h.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
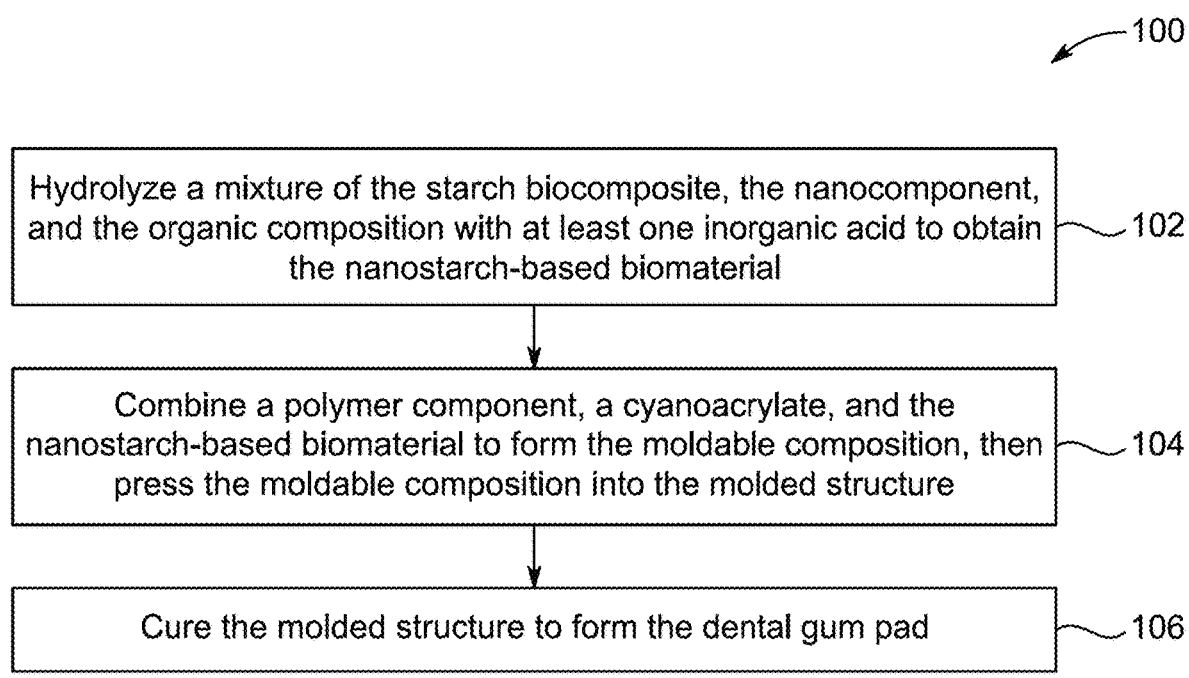
FIG. 1 is a flowchart depicting a method of fabricating an organic dental gum pad, according to certain embodiments.
Figure 2A:
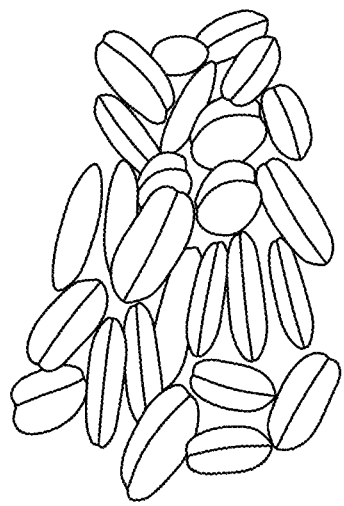
FIG. 2A is a pictorial image of a waste date seed, according to certain embodiments.
Figure 2B:
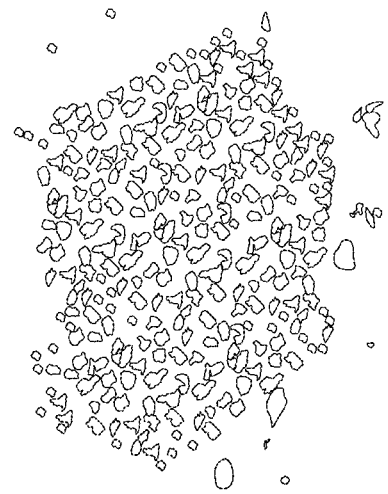
FIG. 2B is a pictorial image of the waste date seed ground into a powder, according to certain embodiments.
Figure 2C:
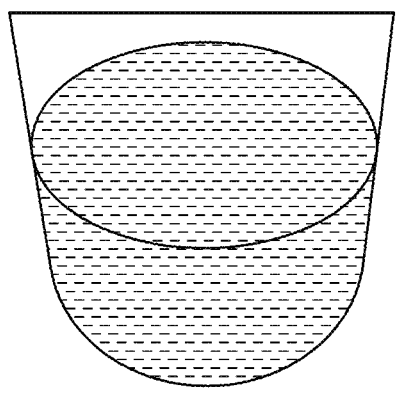
FIG. 2C is a pictorial image showing acid hydrolysis of the powder of the waste date seed, according to certain embodiments.
Figure 2D:
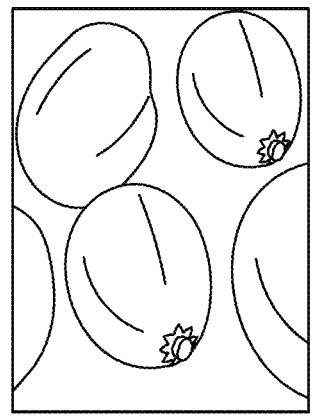
FIG. 2D is a pictorial image of black palm seed, according to certain embodiments.
Figure 2E:
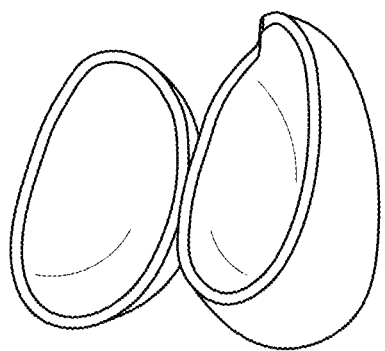
FIG. 2E is a pictorial image of the ground black palm seed, according to certain embodiments.
Figure 2F:
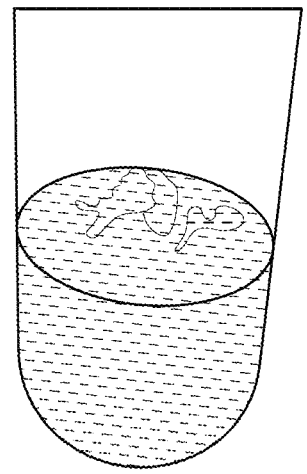
FIG. 2F is a pictorial image showing acid hydrolysis of the ground black palm seed, according to certain embodiments.
Figure 2G:
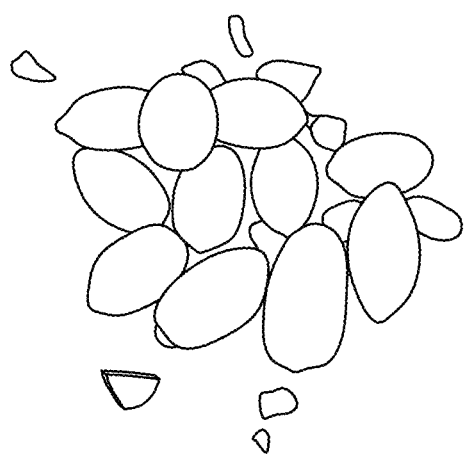
FIG. 2G is a pictorial image of olive seed, according to certain embodiments.
Figure 2H:
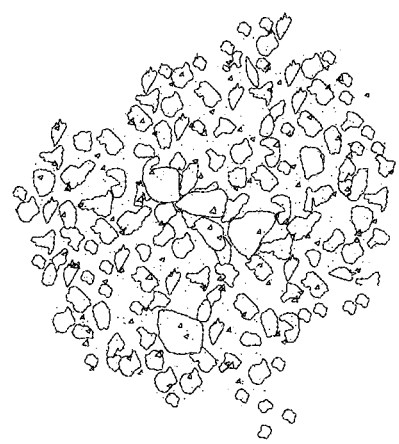
FIG. 2H is a pictorial image of the olive seed ground into a powder, according to certain embodiments.
Figure 2I:
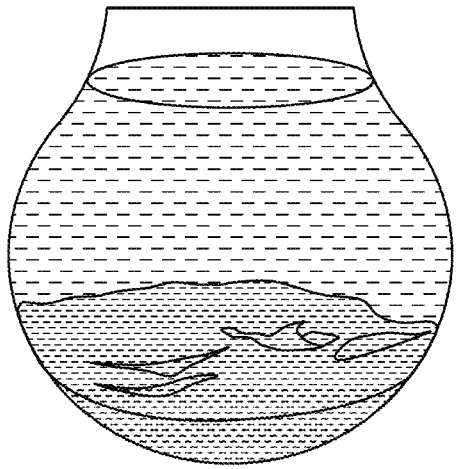
FIG. 2I is a pictorial image showing acid hydrolysis of the ground olive seed, according to certain embodiments.
Figure 2J:
FIG. 2J is a pictorial image of oyster shells, according to certain embodiments.
Figure 2K:
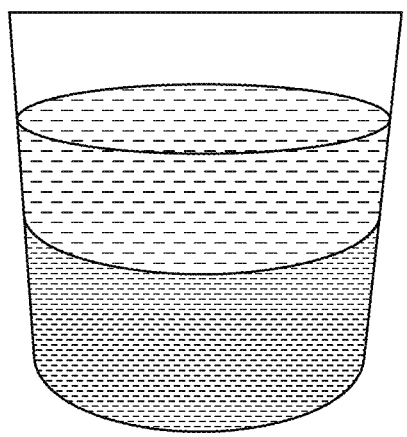
FIG. 2K is a pictorial image showing acid hydrolysis of the oyster shell, according to certain embodiments.
Figure 2L:
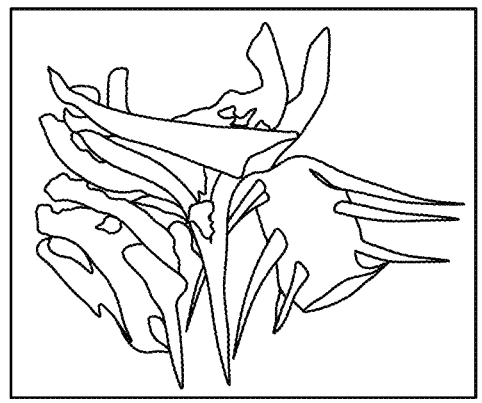
FIG. 2L is a pictorial image of fish bone, according to certain embodiments.
Figure 2M:
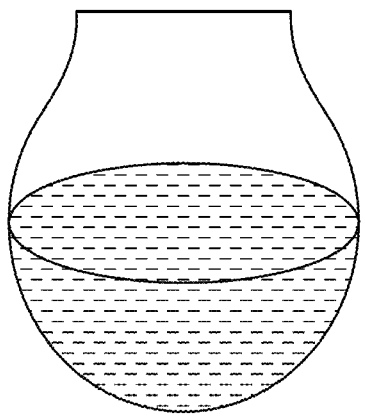
FIG. 2M is a pictorial image showing acid hydrolysis of the fish bone, according to certain embodiments.
Figure 2N:
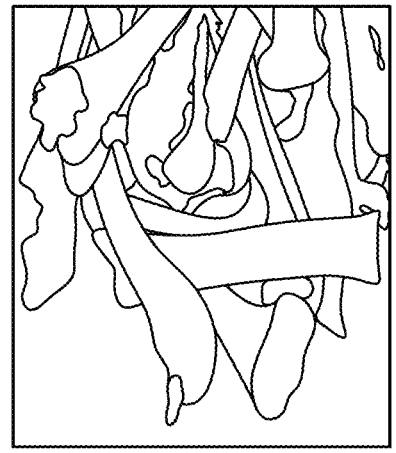
FIG. 2N is a pictorial image of sheep bone, according to certain embodiments.
Figure 2O:
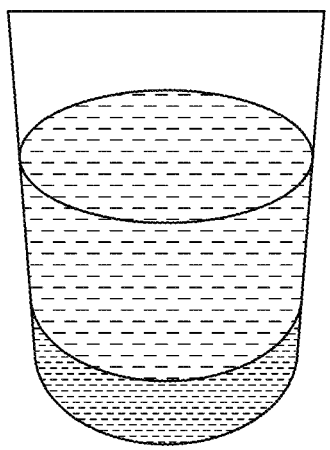
FIG. 2O is a pictorial image showing acid hydrolysis of the sheep bone, according to certain embodiments.
Figure 2P:
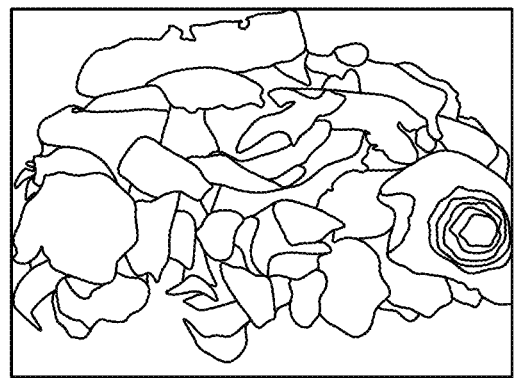
FIG. 2P is a pictorial image of beetroot peel, according to certain embodiments.
Figure 2Q:
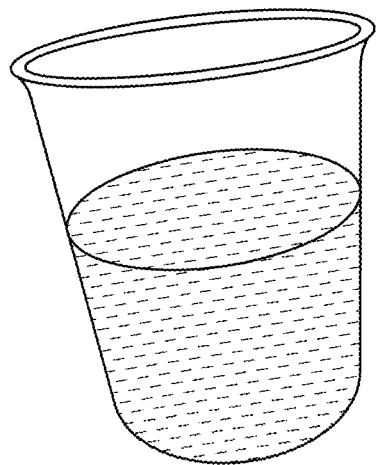
FIG. 2Q is a pictorial image showing the extracted beetroot peel dye, according to certain embodiments.
Figure 2R:
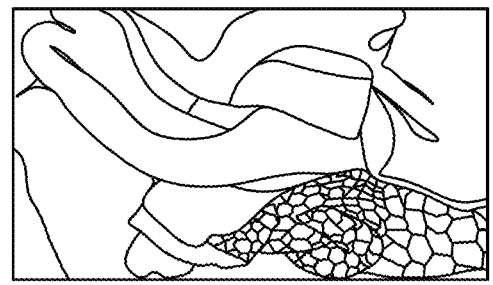
FIG. 2R is a pictorial image of sheep gut, according to certain embodiments.
Figure 2S:
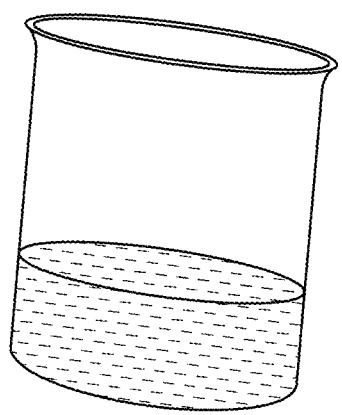
FIG. 2S is a pictorial image of an obtained sheep gut oil-based glycerin, according to certain embodiments.
Figure 2T:
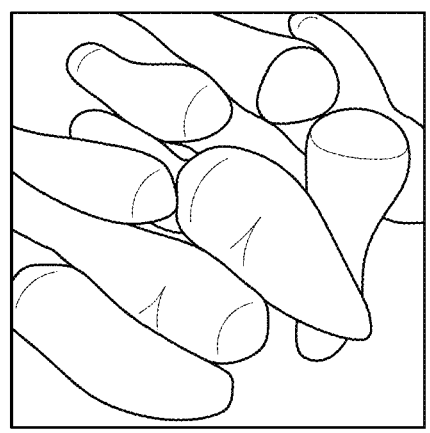
FIG. 2T is a pictorial image of aroid peels, according to certain embodiments.
Figure 2U:
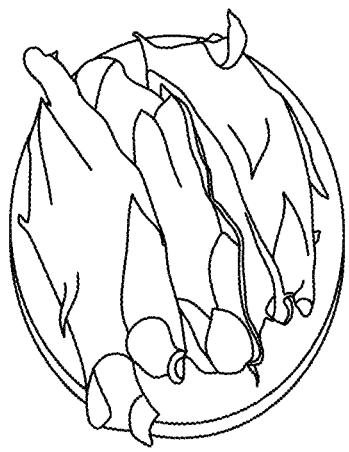
FIG. 2U is a pictorial image of dragon fruit peels, according to certain embodiments.
Figure 2V:
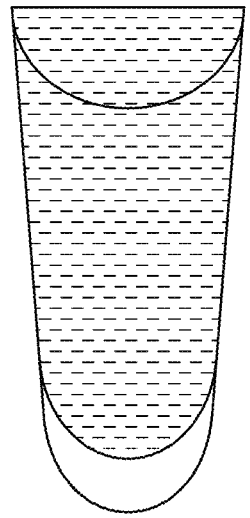
FIG. 2V is a pictorial image showing the extracted dragon fruit peel dye, according to certain embodiments.
Figure 2W:
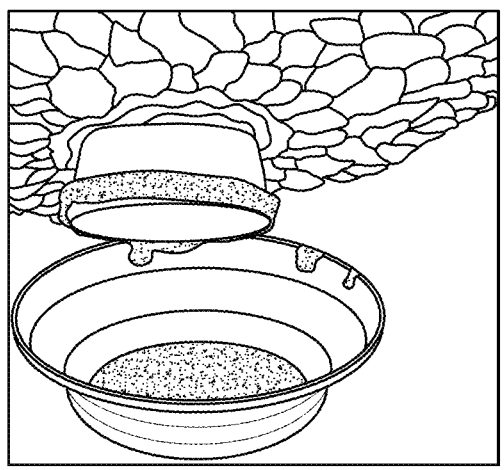
FIG. 2W is a pictorial image of jackfruit latex, according to certain embodiments.
Figure 2X:
FIG. 2X is a pictorial image of a plasticizer mixture without dye, according to certain embodiments.
Figure 2Y:
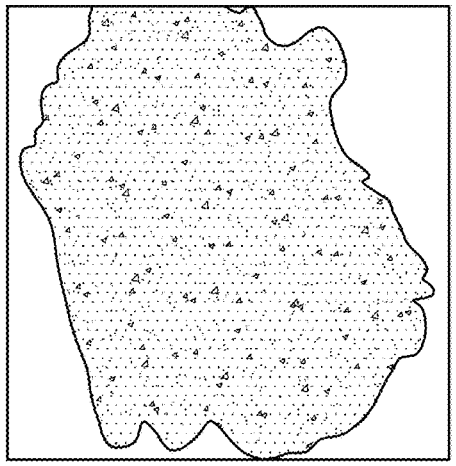
FIG. 2Y is a pictorial image of another plasticizer mixture without dye, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

As used herein, "particle size" and "pore size" may be considered the lengths or longest dimensions of a particle and a pore opening, respectively.

As used herein, the term "organic" refers to a substance or material that can be produced from naturally occurring substances or materials.

As used herein, the term "polymer" refers to a large molecule comprising a chain of smaller repeating units of monomers.

As used herein, the term "plasticizer" refers to substances added to a polymeric material to improve the plasticity and flexibility of the polymer.

As used herein, the term "curing" refers to a chemical process employed in polymer chemistry and process engineering that produces the toughening or hardening of a polymer material by cross-linking of polymer chains. Curing can be induced by various stimuli such as heat, light, radiation, electron beams, or chemical additives.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100 wt. %.

Aspects of the present disclosure are directed to biodegradable dental gum comprising organic sources, including date seed, black palm seed, corn, olive seed, fish bone, oyster shell, coconut shell-based nano-starch, and sheep bone powder. The subject matter discussed herein provides using biodegradable materials to form a moldable composition, and the dental gums prepared from this moldable composition. The formed organic dental gum pad obtained has increased mechanical strength, durability, and aesthetic appearance making it a superior option to traditionally manufactured dental gum pads.

According to an aspect of the present disclosure, an organic dental gum pad formed from a moldable composition is described. In some embodiments, the organic dental gum pad comprises a nanostarch-based biomaterial. In one embodiment, the nanostarch-based biomaterial comprises a nanocomponent, a starch biocomposite, and an organic composition.

In some embodiments, the nanocomponent comprises bio-based materials of animal, plant, bacterial, and/or viral origin. In a specific embodiment, the nanocomponent comprises bio-based materials of plant and animal origin. In a specific embodiment, the nanocomponent comprises at least one selected from a group consisting of fish bone powder, oyster shell powder, coconut shell powder, and sheep bone powder. Fish bone, oyster shell, and sheep bone may serve as useful components of the organic dental gum pad due to their inclusion of hydroxyapatite.

Hydroxyapatite may be important in dental implants, such as dental gum pads, because it may aid in the integration of the dental gum pad with the surrounding bone, leading to faster healing and a stronger bond in a mouth of a subject. Hydroxyapatite may, therefore, aid in increasing the success rate of a dental implant by facilitating osseointegration (i.e., bone growth around the implant) due to its similar composition to natural bone mineral. Moreover, because hydroxyapatite is naturally found in teeth and bones, it is well-tolerated by the body, minimizing the risk of rejection when a dental implant is placed.

In one embodiment, the nanocomponent comprises fish bone powder comprising nanoparticles. Fish bone powder may be used as an organic source of phosphorous, nitrogen, and calcium. In some embodiments, fish bone powder comprises 1 to 10 wt. % nitrogen, 10 to 25 wt. % phosphorous, and 10 to 30 wt. % calcium. In some embodiments, the fish bone powder comprises nanoparticles have an average particle size of 100 nm or less, preferably 90 nm or less, preferably 80 nm or less, preferably 70 nm or less, preferably 60 nm or less, preferably 50 nm or less, preferably 40 nm or less, preferably 30 nm or less, preferably 20 nm or less, most preferably 10 nm or less. In one embodiment, the nanocomponent comprises fish bone powder in an amount of 1 to 30 wt. % relative to a total weight of the nanocomponent, preferably 2 to 29 wt. %, preferably 3 to 28 wt. %, preferably 4 to 27 wt. %, preferably 5 to 26 wt. %, preferably 6 to 25 wt. %, preferably 7 to 25 wt. %, preferably 8 to 25 wt. %, preferably 9 to 25 wt. %, preferably 10 to 25 wt. %, preferably 11 to 25 wt. %, preferably 12 to 25 wt. %, preferably 13 to 25 wt. %, preferably 14 to 25 wt. %, preferably 15 to 25 wt. %, preferably 16 to 25 wt. %, preferably 17 to 25 wt. %, preferably 18 to 25 wt. %, preferably 19 to 25 wt. %, preferably 20 to 25 wt. %, preferably 21 to 25 wt. %, preferably 22 to 25 wt. %, preferably 23 to 25 wt. %, most preferably 24 to 25 wt. %. Suitable examples of fish bone powder include, but are not limited to, blida fish bone meal, tuna fish bone meal, tilapia bone meal, milkfish bone meal, panga bone powder, grass carp bone powder, seabream bone powder, salmon bone powder, and silver carp bone powder.

In an embodiment, the nanocomponent comprises coconut shell powder comprising nanoparticles. In some embodiments, the coconut shell powder comprises nanoparticles have an average particle size of 100 nm or less, preferably 90 nm or less, preferably 80 nm or less, preferably 70 nm or less, preferably 60 nm or less, preferably 50 nm or less, preferably 40 nm or less, preferably 30 nm or less, preferably 20 nm or less, most preferably 10 nm or less. In one embodiment, the nanocomponent comprises coconut shell powder in an amount of 1 to 30 wt. % relative to a total weight of the nanocomponent, preferably 2 to 29 wt. %, preferably 3 to 28 wt. %, preferably 4 to 27 wt. %, preferably 5 to 26 wt. %, preferably 6 to 25 wt. %, preferably 7 to 25 wt. %, preferably 8 to 25 wt. %, preferably 9 to 25 wt. %, preferably 10 to 25 wt. %, preferably 11 to 25 wt. %, preferably 12 to 25 wt. %, preferably 13 to 25 wt. %, preferably 14 to 25 wt. %, preferably 15 to 25 wt. %, preferably 16 to 25 wt. %, preferably 17 to 25 wt. %, preferably 18 to 25 wt. %, preferably 19 to 25 wt. %, preferably 20 to 25 wt. %, preferably 21 to 25 wt. %, preferably 22 to 25 wt. %, preferably 23 to 25 wt. %, most preferably 24 to 25 wt. %. Suitable examples of coconut shell powder include, but are not limited to, coconut shell powder, coconut husk powder, coconut shell charcoal powder, and coconut root powder.

In an embodiment, the nanocomponent comprises nanoparticles derived from oyster shells. In some embodiments, the oyster shell powder comprises nanoparticles have an average particle size of 100 nm or less, preferably 90 nm or less, preferably 80 nm or less, preferably 70 nm or less, preferably 60 nm or less, preferably 50 nm or less, preferably 40 nm or less, preferably 30 nm or less, preferably 20 nm or less, most preferably 10 nm or less. In one embodiment, the nanocomponent comprises oyster shell powder in an amount of 1 to 30 wt. % relative to a total weight of the nanocomponent, preferably 2 to 29 wt. %, preferably 3 to 28 wt. %, preferably 4 to 27 wt. %, preferably 5 to 26 wt. %, preferably 6 to 25 wt. %, preferably 7 to 25 wt. %, preferably 8 to 25 wt. %, preferably 9 to 25 wt. %, preferably 10 to 25 wt. %, preferably 11 to 25 wt. %, preferably 12 to 25 wt. %, preferably 13 to 25 wt. %, preferably 14 to 25 wt. %, preferably 15 to 25 wt. %, preferably 16 to 25 wt. %, preferably 17 to 25 wt. %, preferably 18 to 25 wt. %, preferably 19 to 25 wt. %, preferably 20 to 25 wt. %, preferably 21 to 25 wt. %, preferably 22 to 25 wt. %, preferably 23 to 25 wt. %, most preferably 24 to 25 wt. %. Suitable examples of oyster shell powder may include, but are not limited to, any marine shell powder such as seashell powder, conch shell powder, scallop shell powder, clam shell powder, and mussel shell powder.

In an embodiment, the nanocomponent comprises nanoparticles derived from sheep bone. In some embodiments, the sheep bone powder microparticles are hydrolyzed to nanoparticles by acid hydrolysis. In some embodiments, the sheep bone powder comprises nanoparticles have an average particle size of 100 nm or less, preferably 90 nm or less, preferably 80 nm or less, preferably 70 nm or less, preferably 60 nm or less, preferably 50 nm or less, preferably 40 nm or less, preferably 30 nm or less, preferably 20 nm or less, most preferably 10 nm or less. In one embodiment, the nanocomponent comprises sheep bone powder in an amount of 1 to 30 wt. % relative to a total weight of the nanocomponent, preferably 2 to 29 wt. %, preferably 3 to 28 wt. %, preferably 4 to 27 wt. %, preferably 5 to 26 wt. %, preferably 6 to 25 wt. %, preferably 7 to 25 wt. %, preferably 8 to 25 wt. %, preferably 9 to 25 wt. %, preferably 10 to 25 wt. %, preferably 11 to 25 wt. %, preferably 12 to 25 wt. %, preferably 13 to 25 wt. %, preferably 14 to 25 wt. %, preferably 15 to 25 wt. %, preferably 16 to 25 wt. %, preferably 17 to 25 wt. %, preferably 18 to 25 wt. %, preferably 19 to 25 wt. %, preferably 20 to 25 wt. %, preferably 21 to 25 wt. %, preferably 22 to 25 wt. %, preferably 23 to 25 wt. %, most preferably 24 to 25 wt. %. Suitable examples of sheep bone powder include, but are not limited to, sheep bone ash, sheep bone black, and sheep bone meal.

In a preferred embodiment, the nanocomponent comprises fish bone powder, oyster shell powder, sheep bone powder, and coconut shell powder. In a preferred embodiment, the nanocomponent comprises 24 to 25 wt. % fish bone powder, 24 to 25 wt. % coconut shell powder, 24 to 25 wt. % oyster shell powder, and 24 to 25 wt. % sheep bone powder.

In one embodiment, the nanocomponent comprises graphene. Graphene may improve the integration of a dental implant with the surrounding bone tissue by promoting the differentiation of mesenchymal cells into osteoblasts, which lay down new bone matrix. Further, graphene may help reduce microbial adhesion and risk of complications derived from bacterial infections, such as peri-implantitis and dental caries, upon placement of the dental gum pad. Graphene may also aid in the reduction of inflammation and promote tissue regeneration, which can lead to better healing and more aesthetically pleasing results when the dental gum pad is placed in a mouth of a subject. Incorporation of graphene into the dental gum pad may also help increase the longevity of the implant due to graphene's slow oxidation, decreasing the need for frequent replacement of the dental gum pad. In an embodiment, the graphene may be at least one selected from the group consisting of graphene oxide, graphene quantum dots, graphene nanoparticles, reduced graphene oxide, chemical vapor deposition (CVD) graphene, and/or combinations thereof. In a preferred embodiment, the graphene is graphene oxide. In some embodiments, the amount of graphene oxide in the organic dental gum pad is 1 to 5 wt. % relative to the total weight of the moldable composition, preferably 1.5 to 4.5 wt. %, preferably 1.5 to 4 wt. %, preferably 1.5 to 3.5 wt. %, preferably 1.5 to 3 wt. %, preferably 1.5 to 2.5 wt. %, preferably 1.5 to 2 wt. %, most preferably 2 wt. % relative to the total weight of the moldable composition.

In some embodiments, the moldable composition comprises the nanocomponent in an amount of 20 to 40 wt. % relative to the total weight of the moldable composition, preferably 21 to 39 wt. %, preferably 22 to 38 wt. %, preferably 23 to 37 wt. %, preferably 24 to 36 wt. %, preferably 25 to 35 wt. %, preferably 26 to 34 wt. %, preferably 27 to 34 wt. %, preferably 28 to 34 wt. %, preferably 29 to 34 wt. %, preferably 30 to 34 wt. %, preferably 31 to 34 wt. %, preferably 32 to 34 wt. %, preferably 33 to 34 wt. %, most preferably 34 wt. % relative to the total weight of the moldable composition.

In some embodiments, the starch biocomposite is obtained from bio-based materials of animal, plant, bacterial, and/or viral origin. In a specific embodiment, the starch biocomposite comprises bio-based materials of plant origin. The starch biocomposite of the present disclosure comprises at least one selected from the group consisting of date seed nanoparticles, black palm seed nanoparticles, corn nanoparticles, and olive seed nanoparticles. Date seed, black palm seed coat, corn, olive seed, and the like may be suitable sources of starch and cellulose. Starch and cellulose may function as a binder or additive in the dental gum pad. Further, starch and cellulose may aid in improving mechanical properties of the dental gum pad, particularly when combined with hydroxyapatite. When combined with hydroxyapatite, starch and cellulose may help bind the materials of the dental gum pad together, creating a more stable dental gum pad with increased biomechanical strength. Starch and cellulose are also tolerated well by the human body, minimizing the risk of rejection when the dental gum pad is placed within the mouth of a subject.

In an embodiment, the starch biocomposite comprises nanoparticles obtained from date seed. In some embodiments, the date seed nanoparticles have an average particle size of 100 nm or less, preferably 90 nm or less, preferably 80 nm or less, preferably 70 nm or less, preferably 60 nm or less, preferably 50 nm or less, preferably 40 nm or less, preferably 30 nm or less, preferably 20 nm or less, most preferably 10 nm or less. In one embodiment, the starch biocomposite comprises date seed nanoparticles in an amount of 1 to 30 wt. % relative to a total weight of the starch biocomposite, preferably 2 to 29 wt. %, preferably 3 to 28 wt. %, preferably 4 to 27 wt. %, preferably 5 to 26 wt. %, preferably 6 to 25 wt. %, preferably 7 to 25 wt. %, preferably 8 to 25 wt. %, preferably 9 to 25 wt. %, preferably 10 to 25 wt. %, preferably 11 to 25 wt. %, preferably 12 to 25 wt. %, preferably 13 to 25 wt. %, preferably 14 to 25 wt. %, preferably 15 to 25 wt. %, preferably 16 to 25 wt. %, preferably 17 to 25 wt. %, preferably 18 to 25 wt. %, preferably 19 to 25 wt. %, preferably 20 to 25 wt. %, preferably 21 to 25 wt. %, preferably 22 to 25 wt. %, preferably 23 to 25 wt. %, most preferably 24 to 25 wt. %.

In another embodiment, the starch biocomposite comprises nanoparticles obtained from black palm seed coat. In some embodiments, black palm seed nanoparticles are obtained by acid hydrolysis of the black palm seed microparticles. In some embodiments, the black palm seed nanoparticles have an average particle size of 100 nm or less, preferably 90 nm or less, preferably 80 nm or less, preferably 70 nm or less, preferably 60 nm or less, preferably 50 nm or less, preferably 40 nm or less, preferably 30 nm or less, preferably 20 nm or less, most preferably 10 nm or less. In one embodiment, the starch biocomposite comprises black palm seed coat nanoparticles in an amount of 1 to 30 wt. % relative to a total weight of the starch biocomposite, preferably 2 to 29 wt. %, preferably 3 to 28 wt. %, preferably 4 to 27 wt. %, preferably 5 to 26 wt. %, preferably 6 to 25 wt. %, preferably 7 to 25 wt. %, preferably 8 to 25 wt. %, preferably 9 to 25 wt. %, preferably 10 to 25 wt. %, preferably 11 to 25 wt. %, preferably 12 to 25 wt. %, preferably 13 to 25 wt. %, preferably 14 to 25 wt. %, preferably 15 to 25 wt. %, preferably 16 to 25 wt. %, preferably 17 to 25 wt. %, preferably 18 to 25 wt. %, preferably 19 to 25 wt. %, preferably 20 to 25 wt. %, preferably 21 to 25 wt. %, preferably 22 to 25 wt. %, preferably 23 to 25 wt. %, most preferably 24 to 25 wt. %.

In another embodiment, the starch biocomposite comprises nanoparticles obtained from corn starch. In some embodiments, the corn starch nanoparticles have an average particle size of 100 nm or less, preferably 90 nm or less, preferably 80 nm or less, preferably 70 nm or less, preferably 60 nm or less, preferably 50 nm or less, preferably 40 nm or less, preferably 30 nm or less, preferably 20 nm or less, most preferably 10 nm or less. In one embodiment, the starch biocomposite comprises corn starch nanoparticles in an amount of 1 to 30 wt. % relative to a total weight of the starch biocomposite, preferably 2 to 29 wt. %, preferably 3 to 28 wt. %, preferably 4 to 27 wt. %, preferably 5 to 26 wt. %, preferably 6 to 25 wt. %, preferably 7 to 25 wt. %, preferably 8 to 25 wt. %, preferably 9 to 25 wt. %, preferably 10 to 25 wt. %, preferably 11 to 25 wt. %, preferably 12 to 25 wt. %, preferably 13 to 25 wt. %, preferably 14 to 25 wt. %, preferably 15 to 25 wt. %, preferably 16 to 25 wt. %, preferably 17 to 25 wt. %, preferably 18 to 25 wt. %, preferably 19 to 25 wt. %, preferably 20 to 25 wt. %, preferably 21 to 25 wt. %, preferably 22 to 25 wt. %, preferably 23 to 25 wt. %, most preferably 24 to 25 wt. %.

In another embodiment, the starch biocomposite comprises nanoparticles derived from olive seed. In some embodiments, the olive seed nanoparticles have an average particle size of 100 nm or less, preferably 90 nm or less, preferably 80 nm or less, preferably 70 nm or less, preferably 60 nm or less, preferably 50 nm or less, preferably 40 nm or less, preferably 30 nm or less, preferably 20 nm or less, most preferably 10 nm or less. In one embodiment, the starch biocomposite comprises olive seed nanoparticles in an amount of 1 to 30 wt. % relative to a total weight of the starch biocomposite, preferably 2 to 29 wt. %, preferably 3 to 28 wt. %, preferably 4 to 27 wt. %, preferably 5 to 26 wt. %, preferably 6 to 25 wt. %, preferably 7 to 25 wt. %, preferably 8 to 25 wt. %, preferably 9 to 25 wt. %, preferably 10 to 25 wt. %, preferably 11 to 25 wt. %, preferably 12 to 25 wt. %, preferably 13 to 25 wt. %, preferably 14 to 25 wt. %, preferably 15 to 25 wt. %, preferably 16 to 25 wt. %, preferably 17 to 25 wt. %, preferably 18 to 25 wt. %, preferably 19 to 25 wt. %, preferably 20 to 25 wt. %, preferably 21 to 25 wt. %, preferably 22 to 25 wt. %, preferably 23 to 25 wt. %, most preferably 24 to 25 wt. %.

In a preferred embodiment, the starch biocomposite comprises date seed nanoparticles, black palm seed coat nanoparticles, corn starch nanoparticles, and olive seed nanoparticles. In a preferred embodiment, the starch biocomposite comprises 24 to 25 wt. % date seed nanoparticles, 24 to 25 wt. % black palm seed coat nanoparticles, 24 to 25 wt. % corn starch nanoparticles, and 24 to 25 wt. % olive seed nanoparticles. In one embodiment, the starch biocomposite is present in the moldable composition in an amount of 20 to 45 wt. % relative to a total weight of the moldable composition, preferably 21 to 44 wt. %, preferably 22 to 43 wt. %, preferably 23 to 42 wt. %, preferably 24 to 42 wt. %, preferably 25 to 42 wt. %, preferably 26 to 42 wt. %, preferably 27 to 42 wt. %, preferably 28 to 42 wt. %, preferably 29 to 42 wt. %, preferably 30 to 42 wt. %, preferably 31 to 42 wt. %, preferably 32 to 42 wt. %, preferably 33 to 42 wt. %, preferably 34 to 42 wt. %, most preferably 35 to 42 wt. % relative to the total weight of the moldable composition.

In some embodiments, the organic composition comprises at least one of a *Lannea* sp. glue, waste jackfruit latex, *Acacia nilotica* glue, a sheep gut oil-based glycerin, beetroot peel dye, dragon fruit peel dye, mangosteen dye, pomegranate peel, and aroid peel gel. In a preferred embodiment, the organic composition comprises a *Lannea* sp. glue, waste jackfruit latex, *Acacia nilotica* glue, a sheep gut oil-based glycerin, beetroot peel dye, dragon fruit peel dye, mangosteen dye, pomegranate peel, and aroid peel gel.

In some embodiments, the organic composition comprises waste jackfruit latex from jackfruit trees (*Artocarpus heterophyllus*). Jackfruit trees can be found in tropical areas including Thailand. Waste jackfruit latex is a sticky, white, milky latex that is excreted by jackfruit trees. Waste jackfruit latex is in the form of an aqueous emulsion and comprises many ingredients including, but not limited to, lipids, rubbers, and resins. Waste jackfruit latex can be used as a adhesive or as a natural replacement for synthetic resins, aiding in the production of the disclosed the curable organic moldable composition having increased mechanical strength to form the dental implant pad. Further, waste jackfruit latex has antimicrobial properties, making it a useful addition in dental gum pads, to help avoid complications caused by bacterial infections. In some embodiments, the organic composition comprises waste jackfruit latex in an amount of 1 to 10 wt. % relative to a total weight of the organic composition, preferably 2 to 9 wt. %, preferably 3 to 8 wt. %, preferably 4 to 7 wt. %, preferably 4 to 6 wt. %, preferably 4 to 5 wt. %, most preferably about 4 wt. % relative to a total weight of the organic composition.

In some embodiments, the organic composition comprises a natural glue. In some embodiments, the organic composition comprises a *Lannea* sp. glue. Trees of the *Lannea* genus are found in tropical areas and produce a sap that is sticky due to the presence of sugars produced by photosynthesis, similar to other tree saps. *Lannea* sp glue may aid in creating a dental gum pad having increased mechanical strength and curing properties, while also providing an organic alternative to synthetic adhesives and resins that are often utilized in other dental implants. In one embodiment, the organic composition comprises a *Lannea* sp. glue in an amount of 1 to 10 wt. % relative to a total weight of the organic composition, preferably 2 to 9 wt. %, preferably 3 to 8 wt. %, preferably 3 to 7 wt. %, preferably 3 to 6 wt. %, preferably 3 to 5 wt. %, preferably 3 to 4 wt. %, most preferably 3 wt. % relative to a total weight of the organic composition. In some embodiments, the organic composition comprises *Acacia nilotica* glue. *Acacia nilotica* (Babul tree) is a gum-yielding Acacia species found in the Indian subcontinent. *Acacia nilotica* glue may aid in creating a dental gum pad having increased mechanical strength, while providing an organic alternative to synthetic adhesives often utilized in other dental implants. Moreover, *Acacia nilotica* glue has antimicrobial, antioxidant, and anti-inflammatory properties, making it a suitable additive to maintain tooth mineralization and avoid dental caries. *Acacia nilotica* glue may also help increase the longevity of the implant due to the compounds increase antioxidant and antimicrobial properties, decreasing the need for frequent replacement of the dental gum pad. In some embodiments, the organic composition comprises *Acacia nilotica* glue in an amount of 1 to 10 wt. % relative to the total weight of the organic composition, preferably 2 to 9 wt. %, preferably 3 to 8 wt. %, preferably 3 to 7 wt. %, preferably 3 to 6 wt. %, preferably 3 to 5 wt. %, preferably 3 to 4 wt. %, most preferably about 3 wt. % relative to the total weight of the organic composition.

In some embodiments, the organic composition comprises sheep gut oil-based glycerin. Glycerin can be obtained from animal fat, such as pork fat beef fat, sheep fat, and the like. In an embodiment, the glycerin is obtained from sheep gut, particularly sheep gut oil. Glycerin is highly soluble in water and enhances the degradability of a polymer when added as a plasticizing agent. Further, when a curable composition is cured, oxygen in the air may cause an interference in the polymerization resulting in the formation of an oxygen inhibition layer on the surface of the composition. The oxygen-inhibited layer may then result in a sticky, resin-rich uncured layer that is left on the surface of the composition. Glycerin may create a stronger dental gum pad by interrupting the oxygen interfering with a surface of the moldable composition when curing occurs, thus eliminating the creating of the uncured layer on the surface of the molded structure. In some embodiments, the organic composition comprises sheep gut oil-based glycerin in an amount of 1 to 15 wt. % relative to a total weight of the organic composition, preferably 2 to 14 wt. %, preferably 3 to 13 wt. %, preferably 3 to 12 wt. %, preferably 3 to 11 wt. %, preferably 3 to 10 wt. %, preferably 3 to 9 wt. %, preferably 3 to 8 wt. %, preferably 3 to 7 wt. %, preferably 3 to 6 wt. %, preferably 3 to 5 wt. %, preferably 3 to 4 wt. %, most preferably 3 wt. % relative to a total weight of the organic composition.

In some embodiments, the organic composition comprises an organic dye. In some embodiments, the organic composition comprises at least one organic dye selected from the group consisting of beetroot peel dye, dragon fruit peel dye, pomegranate peels, aroid peel gel, and mangosteen dye. In a preferred embodiment, the organic composition comprises beetroot peel dye, dragon fruit peel dye, pomegranate peels, aroid peel gel, and mangosteen dye. The dye may be in the form of a powder, liquid, or gel. When extracted from pomegranate peels, the organic dye is a green-yellow color of varying intensity. When extracted from mangosteen peels, the resulting organic dye obtained is generally a red, a purple, and/or a blue color, depending on the extraction method. When extracted from beetroot peels, the resulting organic dye is a red, pink, or fuchsia color. When extracted from dragon fruit peels, the resulting organic dye is a red, orange, or purple color. Aroids are from the family Araceae and include many common houseplants like aglaonemas, monsteras, philodendrons, pothos and ZZ plants. Aroid plants may come in a variety of colors including, but not limited to, green, red, pink, and white. In a preferred embodiment, the aroid peels are white, red, or pink. When extracted from aroid peels, the resulting organic dye is a milky white, red, pink, or fuchsia color. In some embodiments, the beetroot peel dye, dragon fruit peel dye, pomegranate peels, aroid peel gel, and mangosteen dye are obtained by individually grinding the pomegranate peels, beetroot peels, dragon fruit peels, aroid peels, and mangosteen peels into fine powders. In one embodiment, the fine powder obtained from the pomegranate peels, beetroot peels, dragon fruit peels, aroid peels, and mangosteen peels has an average particle size of 100 to 200 µm, preferably 110 to 190 µm, preferably 120 to 180 µm, preferably 130 to 170 µm, preferably 140 to 160 µm, most preferably 150 µm. Once the fine powders of the pomegranate peels, beetroot peels, dragon fruit peels, aroid peels, and mangosteen peels are obtained, the pigments are extracted from the powders by simmering the powder in a solvent, the length of simmering depending on the dye shade desired. In one embodiment, the peels are boiled in the solvent for 1 to 24 h, preferably 2 to 22 h, preferably 2 to 20 h, preferably 2 to 18 h, preferably 2 to 16 h, preferably 2 to 14 h, preferably 2 to 12 h, preferably 2 to 10 h, preferably 2 to 8 h, preferably 2 to 6 h, preferably 2 to 4 h, most preferably 2 h. Any suitable solvent may be used such as water, ethanol, acetone, methanol, acetonitrile, dimethyl sulfoxide (DMSO), chloroform, n-hexane, ethyl acetate, toluene, dichloromethane (DCM), isopropanol, or any other suitable extraction solvent. In one embodiment, the extraction solvent is water. In one embodiment, the pigments from the peels of beetroot, dragon fruit, pomegranate, aroid, and mangosteen are extracted to acquire a similar color to that of natural, healthy gums surrounding a subject's teeth to result in a natural-looking dental gum pad.

In an embodiment, the organic composition comprises the beetroot peel dye in an amount of 1 to 20 wt. % relative to a total weight of the organic composition, preferably 2 to 19 wt. %, preferably 3 to 18 wt. %, preferably 4 to 17 wt. %, preferably 5 to 16 wt. %, preferably 6 to 15 wt. %, preferably 7 to 14 wt. %, preferably 8 to 13 wt. %, preferably 9 to 12 wt. %, preferably 10 to 11 wt. %, most preferably 10 wt. % relative to a total weight of the organic composition. In an embodiment, the organic composition comprises the dragon fruit peel dye in an amount of 1 to 20 wt. % relative to a total weight of the organic composition, preferably 2 to 19 wt. %, preferably 3 to 18 wt. %, preferably 4 to 17 wt. %, preferably 5 to 16 wt. %, preferably 6 to 15 wt. %, preferably 7 to 14 wt. %, preferably 8 to 13 wt. %, preferably 9 to 12 wt. %, preferably 10 to 11 wt. %, most preferably 10 wt. % relative to a total weight of the organic composition. In an embodiment, the organic composition comprises the mangosteen peel in an amount of 25 to 40 wt. % relative to a total weight of the organic composition, preferably 26 to 39 wt. %, preferably 27 to 38 wt. %, preferably 28 to 37 wt. %, preferably 29 to 36 wt. %, preferably 30 to 35 wt. %, preferably 31 to 34 wt. %, preferably 31 to 33 wt. %, preferably 31 to 32 wt. %, most preferably 31 wt. % relative to a total weight of the organic composition. In an embodiment, the organic composition comprises the pomegranate peel in an amount of 20 to 40 wt. % relative to a total weight of the organic composition, preferably 21 to 39 wt. %, preferably 22 to 38 wt. %, preferably 23 to 37 wt. %, preferably 24 to 36 wt. %, preferably 25 to 36 wt. %, preferably 26 to 36 wt. %, preferably 27 to 36 wt. %, preferably 28 to 36 wt. %, preferably 29 to 36 wt. %, preferably 30 to 36 wt. %, preferably 31 to 36 wt. %, preferably 32 to 36 wt. %, preferably 33 to 36 wt. %, preferably 34 to 36 wt. %, preferably 35 to 36 wt. %, most preferably 36 wt. % relative to a total weight of the organic composition.

In a specific embodiment, the organic composition comprises waste jackfruit latex in an amount of 4 wt. %, *Lannea* sp glue in an amount of 3 wt. %, *Acacia nilotica* glue in an amount of 3 wt. %, aroid peel gel in an amount of 3 wt. %, beetroot peel dye in an amount of 10 wt. %, dragon fruit peel dye in an amount of 10 wt. %, pomegranate peel in an amount of 36 wt. %, mangosteen peel dye in an amount of 31 wt. %, and sheep gut oil-based glycerin in an amount of 3 wt. % relative to a total weight of the organic composition.

In some embodiments, the moldable composition comprises the organic composition in an amount of 10 to 30 wt. % relative to the total weight of the moldable composition, preferably 11 to 29 wt. %, preferably 12 to 28 wt. %, preferably 13 to 27 wt. %, preferably 14 to 26 wt. %, preferably 15 to 25 wt. %, preferably 16 to 24 wt. %, most preferably 16 to 23 wt. % relative to the total weight of the moldable composition.

The organic dental gum pad formed from a moldable composition comprises at least one polymer component. The polymer components aid in controlling the polymerization process and, when incorporated into the gum, provide sufficient mechanical strength, plasticity, and flexibility to achieve a natural and comfortable feeling dental gum pad having sufficient strength and durability to serve as a base for prosthetic teeth. The polymer component is present in an amount of 1 to 15 wt. %, preferably 2 to 14 wt. %, preferably 3 to 13 wt. %, preferably 4 to 12 wt. %, preferably 4 to 11 wt. %, preferably 4 to 10 wt. %, preferably 4 to 9 wt. %, preferably 4 to 8 wt. %, preferably 4 to 7 wt. %, preferably 4 to 6 wt. %, preferably 4 to 5 wt. %, most preferably 4 wt. % relative to the total weight of the moldable composition. In one embodiment, the polymer component comprises at least one selected from the group consisting of polymethyl methacrylate (PMMA), a polylactic glycolic acid (PLGA), and silicone. In one embodiment, the polymer component is PMMA. In another embodiment, the PMMA is present in an amount of about 1 to 10 wt. % relative to a total weight of the moldable composition, preferably 2 to 9 wt. %, preferably 2 to 8 wt. %, preferably 2 to 7 wt. %, preferably 2 to 6 wt. %, preferably 2 to 5 wt. %, preferably 2 to 4 wt. %, preferably 2 to 3 wt. %, most preferably 2 wt. % relative to a total weight of the moldable composition. In another embodiment, the PLGA is present in an amount of about 1 to 10 wt. % relative to a total weight of the moldable composition, preferably 1 to 9 wt. %, preferably 1 to 8 wt. %, preferably 1 to 7 wt. %, preferably 1 to 6 wt. %, preferably 1 to 5 wt. %, preferably 1 to 4 wt. %, preferably 1 to 3 wt. %, preferably 1 to 2 wt. %, most preferably 1 wt. % relative to a total weight of the moldable composition. In another embodiment, the silicone is present in an amount of about 1 to 10 wt. % relative to a total weight of the moldable composition, preferably 1 to 9 wt. %, preferably 1 to 8 wt. %, preferably 1 to 7 wt. %, preferably 1 to 6 wt. %, preferably 1 to 5 wt. %, preferably 1 to 4 wt. %, preferably 1 to 3 wt. %, preferably 1 to 2 wt. %, most preferably 1 wt. % relative to a total weight of the moldable composition. In a preferred embodiment, the moldable composition comprises 2 wt. % of PMMA, 1 wt. % of PLGA, 1 wt. % of silicone based on the total weight of the moldable composition.

The organic dental gum pad formed from a moldable composition comprises adhesives, which are important for bonding its components to ensure a durable and strong dental gum pad. In an embodiment, the adhesive is an acrylic adhesive. In some embodiments, the acrylate adhesive is a cyanoacrylate. Suitable cyanoacrylates include, but are not limited to, methyl 2-cyanoacrylate (MCA), ethyl 2-cyanoacrylate (ECA), n-butyl cyanoacrylate (n-BCA), octyl cyanoacrylate, and 2-octyl cyanoacrylate. In one embodiment, the cyanoacrylate is present in an amount of 1 to 10 wt. % relative to a total weight of the moldable composition, preferably 2 to 9 wt. %, preferably 3 to 8 wt. %, preferably 4 to 7 wt. %, preferably 4 to 6 wt. %, preferably 4 to 5 wt. %, most preferably about 4 wt. % relative to a total weight of the moldable composition.

The organic dental gum pad is formed by molding the moldable composition into a molded structure with a thickness of 0.5 to 4 mm, preferably 1 to 3.5 mm, most preferably 1.5 to 3 mm. A dental gum pad thickness of 1.5 to 3 mm is suitable to mimic a healthy human gum thickness. The molded structure comprises several periodontal pockets arranged along a perimeter of the molded structure and having a depth of 1 to 3 mm for the insertion of composite teeth implants. The composite teeth implants may be inserted into the dental gum pad by any known method such as, but not limited to, screws, adhesive, and the like.

Referring to FIG. 1, a method of fabricating the organic dental gum pad is disclosed. The order in which the method described is not intended to be construed as a limitation, and any number of the described method steps can be combined in any order to implement the method for nanocomposite organic teeth manufacturing. Additionally, individual steps may be removed or skipped from the method without departing from the spirit and scope of the present disclosure.

At step 102, the method 100 comprises hydrolyzing a mixture of the starch biocomposite, the nanocomponent, and the organic composition with at least one inorganic acid to obtain the nanostarch-based biomaterial. In one embodiment, the mixture may be subjected to pyrolysis before hydrolysis. Pyrolysis is the heating of an organic material in the absence of oxygen. In some embodiments, the mixture is pyrolyzed at a temperature of 100 to 300° C., preferably 105 to 295° C., preferably 110 to 290° C., preferably 115 to 285° C., preferably 120 to 280° C., preferably 125 to 275° C., preferably 130 to 270° C., preferably 135 to 265° C., preferably 135 to 260° C., preferably 135 to 255° C., preferably 135 to 250° C., preferably 135 to 245° C., preferably 135 to 240° C., preferably 135 to 235° C., preferably 135 to 230° C., preferably 135 to 225° C., preferably 135 to 220° C., preferably 135 to 215° C., preferably 135 to 210° C., preferably 135 to 205° C., preferably 135 to 200° C., preferably 135 to 195° C., preferably 135 to 190° C., preferably 135 to 185° C., preferably 135 to 180° C., preferably 135 to 175° C., preferably 135 to 170° C., preferably 135 to 165° C., preferably 135 to 160° C., preferably 135 to 155° C., preferably 135 to 150° C., preferably 135 to 145° C., preferably 135 to 140° C., most preferably 135° C. In some embodiments, the mixture bone is pyrolyzed for 1 to 4 h, preferably 1.5 to 3.5 h, preferably 2 to 3 h, most preferably 3 h. In an embodiment, the mixture is pyrolyzed at a temperature of 135° C. for 3 h to obtain a pyrolyzed mixture. In some embodiments, the pyrolyzed mixture comprises microparticles have an average particle size of 100 μm or less, preferably 90 μm or less, preferably 80 μm or less, preferably 70 μm or less, preferably 60 μm or less, preferably 50 μm or less, preferably 40 μm or less, preferably 30 μm or less, preferably 20 μm or less, most preferably 10 μm or less. In some embodiments, the pyrolyzed mixture microparticles are converted to nanoparticles by acid hydrolysis. Acid hydrolysis produces nanoparticles by the acid serving as a catalyst to selectively break down the amorphous regions of a sample material, leaving behind the more crystalline, ordered nanostructures. In one embodiment, the acid may be organic or inorganic. In a preferred embodiment, the acid is an inorganic acid. In another embodiment, the inorganic acid is at least one selected from hydrochloric acid, nitric acid, hydrobromic acid, sulfuric acid, hydrofluoric acid, and phosphorous acid. In a preferred embodiment, the inorganic acid is sulfuric acid. The concentration of sulfuric acid may be about 80 to 90%. In some embodiments, sulfuric acid concentrations are about 81%, 82%, 83%, 84%, 85%, 86%, 87%, 88%, 89%, or 90%. In a preferred aspect, sulfuric acid concentration may be about 85 to 86%.

In another embodiment, each component of the starch biopolymer, the nanocomponent, and the organic composition is individually pyrolyzed then hydrolyzed to obtain their respective nanoparticles before mixing the components together to form the starch biopolymer, the nanocomponent, and the organic composition. In such an embodiment, the components are individually pyrolyzed at a temperature of 100 to 300° C., preferably 105 to 295° C., preferably 110 to 290° C., preferably 115 to 285° C., preferably 120 to 280° C., preferably 125 to 275° C., preferably 130 to 270° C., preferably 135 to 265° C., preferably 135 to 260° C., preferably 135 to 255° C., preferably 135 to 250° C., preferably 135 to 245° C., preferably 135 to 240° C., preferably 135 to 235° C., preferably 135 to 230° C., preferably 135 to 225° C., preferably 135 to 220° C., preferably 135 to 215° C., preferably 135 to 210° C., preferably 135 to 205° C., preferably 135 to 200° C., preferably 135 to 195° C., preferably 135 to 190° C., preferably 135 to 185° C., preferably 135 to 180° C., preferably 135 to 175° C., preferably 135 to 170° C., preferably 135 to 165° C., preferably 135 to 160° C., preferably 135 to 155° C., preferably 135 to 150° C., preferably 135 to 145° C., preferably 135 to 140° C., most preferably 135° C. In some embodiments, the components are individually pyrolyzed for 1 to 4 h, preferably 1.5 to 3.5 h, preferably 2 to 3 h, most preferably 3 h. In an embodiment, the components are individually pyrolyzed at a temperature of 135° C. for 3 h to obtain a pyrolyzed mixture. In some embodiments, the individually pyrolyzed components comprise microparticles have an average particle size of 100 μm or less, preferably 90 μm or less, preferably 80 μm or less, preferably 70 μm or less, preferably 60 μm or less, preferably 50 μm or less, preferably 40 μm or less, preferably 30 μm or less, preferably 20 μm or less, most preferably 10 μm or less. The individually pyrolyzed components are individually hydrolyzed to obtain nanoparticles of the respective components. In some embodiments, the individually hydrolyzed components comprise nanoparticles have an average particle size of 100 nm or less, preferably 90 nm or less, preferably 80 nm or less, preferably 70 nm or less, preferably 60 nm or less, preferably 50 nm or less, preferably 40 nm or less, preferably 30 nm or less, preferably 20 nm or less, most preferably 10 nm or less. Once nanoparticles of each component are obtained, the starch biopolymer, nanocomponent, and organic composition are then mixed to obtain the nanostarch-based biomaterial. In one embodiment, the nanostarch-based biomaterial obtained is in the form of nanoparticles having an average particle size of 30 nm or less, preferably 29 nm or less, preferably 28 nm or less, preferably 27 nm or less, preferably 26 nm or less, preferably 25 nm or less, preferably 24 nm or less, preferably 23 nm or less, preferably 22 nm or less, preferably 21 nm or less, most preferably 20 nm or less.

At step 104, the method 100 comprises combining the polymer component, the cyanoacrylate, and the nanostarch-based biomaterial to form the moldable composition, then pressing the moldable composition into the molded structure. The polymer components, including polymethyl methacrylate (PMMA), a polylactic glycolic acid (PLGA), and silicone, are mixed with the cyanoacrylate and the nanostarch-based biomaterial to form the moldable composition. The pressing of the moldable composition into the molded structure may be performed by any known method including, but not limited to, compression molding, injection molding, vacuum molding, transfer molding, and the like. In a preferred embodiment, the moldable composition is pressed into a molded structure by compression molding with a force of 1000 to 2000 psi to obtain the moldable composition.

Figure 3A:
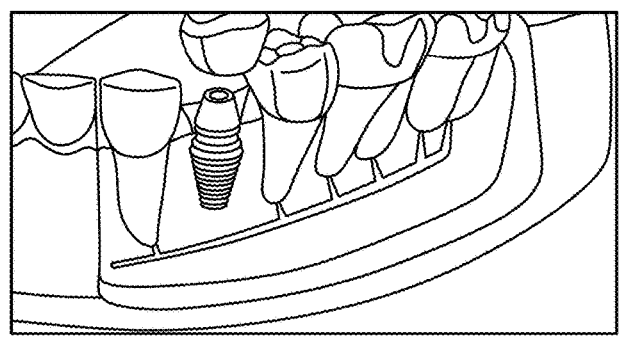
FIG. 3A a pictorial image of artificial/synthetic dental gums with teeth and screws, according to certain embodiments.
Figure 3B:
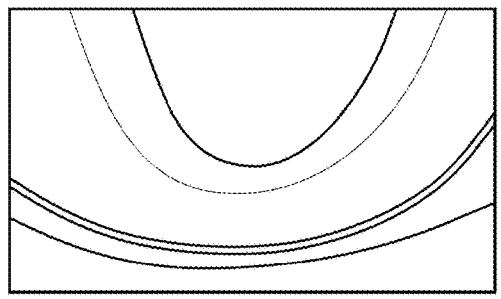
FIG. 3B shows a pictorial image of organic dental gum pads, without implants, before drying, according to certain embodiments.
Figure 3C:
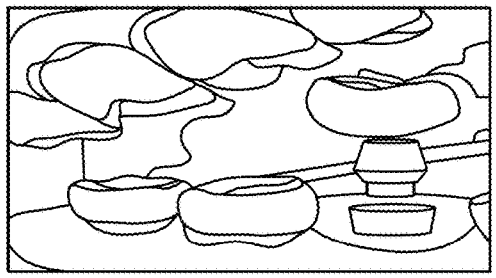
FIG. 3C shows a pictorial image of the organic dental gum pad with an implant on a single side, according to certain embodiments.
Figure 3D:
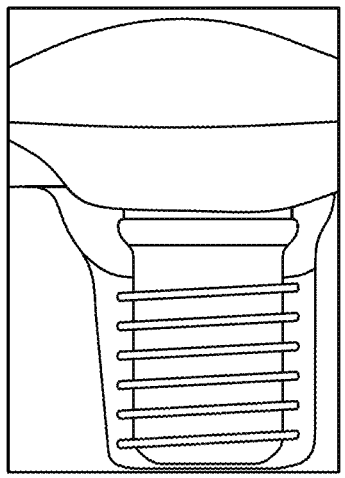
FIG. 3D shows a pictorial image of an organic dental gum pad with a screw, according to certain embodiments.
Figure 3E:
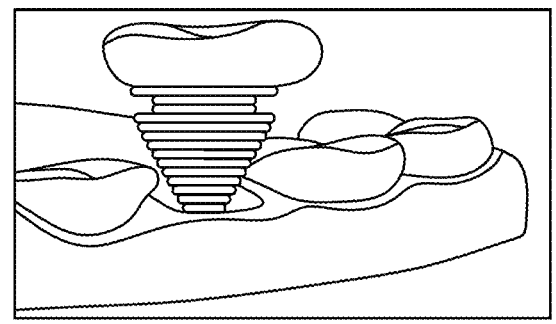
FIG. 3E shows a pictorial image of an organic dental gum pad with an implant being attached by a screw, according to certain embodiments.
Figure 3F:
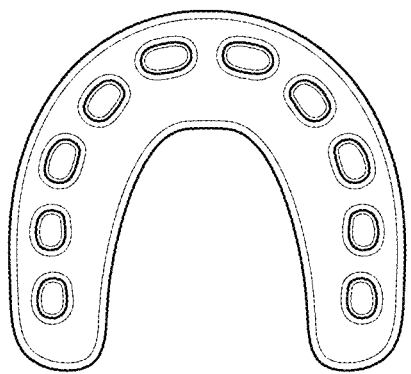
FIG. 3F shows a pictorial image of an organic dental gum pad having a plurality of periodontal pockets, according to certain embodiments.
Figure 3G:
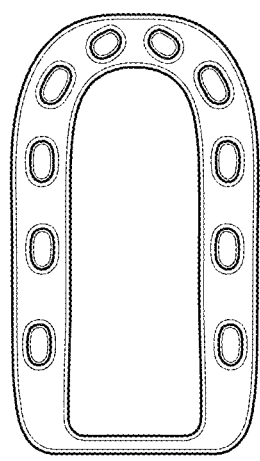
FIG. 3G shows a pictorial image of another organic dental gum pad having a plurality of periodontal pockets, according to certain embodiments.
Figure 3H:
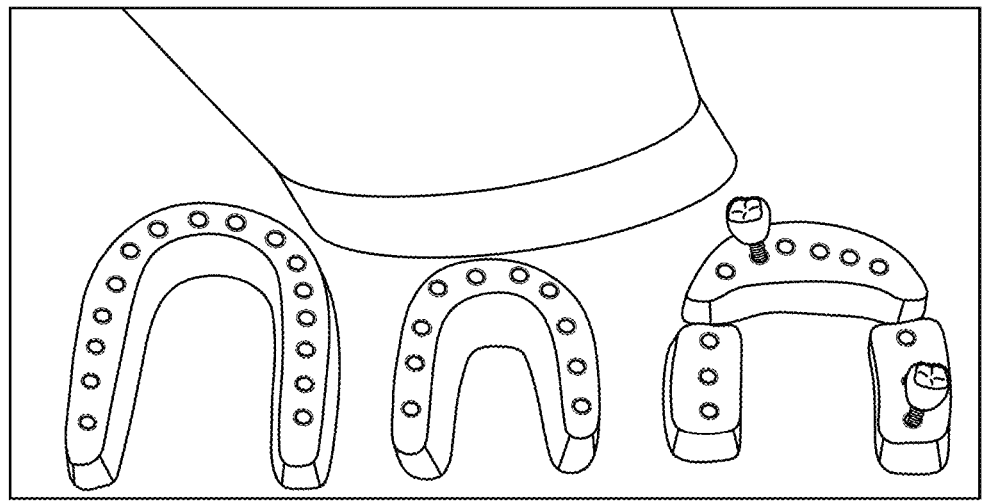
FIG. 3H shows a pictorial image of organic dental gum pads with different types of implants during the drying process, according to certain embodiments.
Figure 3I:
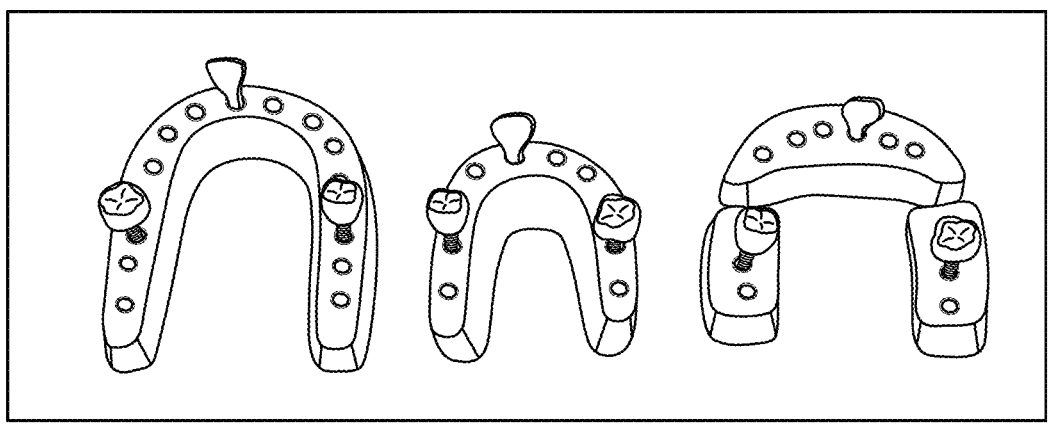
FIG. 3I shows a pictorial image of single sided organic dental gum pads with different types of organic implants, according to certain embodiments.

At step 106, the method 100 comprises curing the molded structure to form the dental gum pad. In one embodiment, the molded structure is cured via photocuring or thermal curing to form the dental crown. Thermal curing is the process of temperature-induced chemical change in a material, such as the polymerization of a thermoset resin. Photocuring, also known as photopolymerization, is a process that hardens a substance by exposing it to a specific wavelength of light. The process involves irradiating specially formulated compositions, usually liquid and solventless, with ultraviolet or visible light to rapidly convert them into solid films. In an embodiment, the molded structure is cured by photocuring with a light curing device for 10 to 30 seconds(s) at a light intensity of 250 to 850 mW/cm$^2$. In one embodiment, the molded structure is cured with a light curing device for 11 to 29 s, preferably 12 to 28 s, preferably 13 to 27 s, preferably 14 to 26 s, preferably 15 to 25 s, preferably 16 to 24 s, preferably 17 to 23 s, preferably 18 to 22 s, preferably 19 to 20 s. In one embodiment, the molded structure is cured at a light intensity of 250 to 850 mW/cm$^2$, preferably 260 to 840 mW/cm$^2$, preferably 270 to 830 mW/cm$^2$, preferably 280 to 820 mW/cm$^2$, preferably 290 to 810 mW/cm$^2$, preferably 300 to 800 mW/cm$^2$, preferably 310 to 790 mW/cm$^2$, preferably 320 to 780 mW/cm$^2$, preferably 330 to 770 mW/cm$^2$, preferably 340 to 760 mW/cm$^2$, preferably 350 to 750 mW/cm$^2$, preferably 360 to 740 mW/cm$^2$, preferably 370 to 730 mW/cm$^2$, preferably 380 to 720 mW/cm$^2$, preferably 390 to 710 mW/cm$^2$, preferably 400 to 700 mW/cm$^2$, preferably 400 to 690 mW/cm$^2$, preferably 400 to 680 mW/cm$^2$, preferably 400 to 670 mW/cm$^2$, preferably 400 to 660 mW/cm$^2$, preferably 400 to 650 mW/cm$^2$, preferably 400 to 640 mW/cm$^2$, preferably 400 to 630 mW/cm$^2$, preferably 400 to 620 mW/cm$^2$, preferably 400 to 610 mW/cm$^2$, preferably 400 to 600 mW/cm$^2$, preferably 400 to 590 mW/cm$^2$, preferably 400 to 580 mW/cm$^2$, preferably 400 to 570 mW/cm$^2$, preferably 400 to 560 mW/cm$^2$, preferably 400 to 550 mW/cm$^2$, preferably 400 to 540 mW/cm$^2$, preferably 400 to 530 mW/cm$^2$, preferably 400 to 520 mW/cm$^2$, preferably 400 to 510 mW/cm$^2$, most preferably 400 to 500 mW/cm$^2$. In another embodiment, the molded structure is cured by thermal curing at a temperature of 100 to 160° C. for 3 to 6 h. In one embodiment, the molded structure is cured at a temperature of 105 to 155° C., preferably 110 to 150° C., preferably 115 to 145° C., preferably 120 to 140° C., preferably 125 to 135° C., most preferably 130° C. The optical images of the organic dental gum pad of the present disclosure without implants are depicted in FIGS. 3B, 3F, and 3G and with implants are depicted in FIGS. 3A, 3C, 3D, 3E, 3H, and 3I.

The dental gum pad of the present disclosure has a tensile strength of 75 to 115 mPa/kg·m$^3$, preferably 86 to 114 mPa/kg·m$^3$, preferably 87 to 113 mPa/kg·m$^3$, preferably 88 to 112 mPa/kg·m$^3$, preferably 89 to 111 mPa/kg·m$^3$, preferably 90 to 110 mPa/kg·m$^3$, preferably 91 to 109 mPa/kg·m$^3$, preferably 92 to 108 mPa/kg·m$^3$, preferably 93 to 107 mPa/kg·m$^3$, preferably 94 to 106 mPa/kg·m$^3$, preferably 94 to 105 mPa/kg·m$^3$, preferably 94 to 104 mPa/kg·m$^3$, preferably 94 to 103 mPa/kg·m$^3$, preferably 94 to 102 mPa/kg·m$^3$, preferably 94 to 101 mPa/kg·m$^3$, preferably 94 to 100 mPa/kg·m$^3$, preferably 94 to 99 mPa/kg·m$^3$, preferably 94 to 98 mPa/kg·m$^3$, preferably 94 to 97 mPa/kg·m$^3$, preferably 94 to 96 mPa/kg·m$^3$, preferably 94 to 95 mPa/kg·m$^3$, most preferably 94.5 mPa/kg·m$^3$.

The dental gum pad of the present disclosure has a tensile modulus of 0.5 to 3 GPa, preferably 0.6 to 2.9 GPa, preferably 0.7 to 2.8 GPa, preferably 0.8 to 2.7 GPa, preferably 0.9 to 2.6 GPa, preferably 1 to 2.5 GPa, preferably 1.1 to 2.4 GPa, preferably 1.2 to 2.3 GPa, preferably 1.3 to 2.2 GPa, preferably 1.4 to 2.1 GPa, preferably 1.5 to 2 GPa, preferably 1.6 to 1.9 GPa, preferably 1.7 to 1.8 GPa, most preferably 1.7 GPa.

EXAMPLES

The following examples illustrate an organic dental gum pad. The examples are provided solely for illustration and are not to be construed as limitations of the present disclosure, as many variations thereof are possible without departing from the spirit and scope of the present disclosure.

Example 1: PH and Starch Determination

The pH and cellulose content of the starch of the organic dental gum pad of the present disclosure were determined, and their values were compared to those of surgical synthetic dental gums available in the market. The quantitative determination of starch was carried out using methods known in the art. The results of this study are depicted in Table 1.

TABLE 1 pH, cellulose, and starch determination

| Materials | pH Determination | Starch Determination | Cellulose determination |
|---|---|---|---|
| Organic dental gum pad | 7.9 ± 0.03 | 41.4% ± 0.03 | 35.5% ± 0.2 |
| Synthetic dental gum | Alkaline ≥7 | It is zero if from gas or oil, if from starch sample it is 20 to 60%. | It is zero if from gas or oil, if from cellulose sample it is 20 to 40% |

Example 2: Nanostarch and Nanocellulose Measurement

The particle size of the nanostarch and nanocellulose was measured by Scanning Electron Microscopy (SEM), and the results indicate that the nanoparticle size of the moldable composition forming the organic dental gum pad was 18 nm. In comparison, the nanoparticle size range for standard synthetic dental gums typically falls between 1 and 100 nm. This illustrates that the moldable composition forming the organic dental gum pad of the present disclosure has a finer particle size, allowing for the enhancement of the tensile strength, an increase in the flexural strength, a high fracture toughness, and an increase in the shear bond strength of the organic dental gum pad.

TABLE 2

Measurement of nanostarch and nanocellulose by SEM

| Materials | Nanostarch size | Nanocellulose size | Average nanoparticle size |
|---|---|---|---|
| Organic dental gum pad | 18 nm | 22 nm | 20 nm |
| Synthetic dental gum | 1 to 100 nm (Standard) | 1 to 100 nm (Standard) | 1 to 100 nm (Standard) |

Example 3: Absorption Test (as ASTM D570)

The dental gum pad prepared was further evaluated for its ability to absorb moisture. The tests to determine water absorption were carried out in accordance with ASTM D570. The purpose of ASTM D570 is to determine the rate of water absorption by immersing the specimen in water for a specific period. In this test, the dental gum pad absorbed 0.03% water. Water absorption was calculated by determining the percentage increase in weight of the sample following the experiment to characterize this attribute. The results of this study are depicted in Table 3. It can be observed that the water absorption for the dental gum pad prepared by the present disclosure is very low compared to surgical dental gum, illustrating their water-resistant property which may provide for a more stable and durable dental gum pad.

TABLE 3

Determination of water absorption by ASTM D570.

| Materials | Water absorption | ASTM D570 Water absorption |
|---|---|---|
| Organic dental gum pad | 0.03% | Water absorption by ASTM is 0 to 0.16%. |
| Synthetic dental gum | 0 to 0.16% | |

Example 4: Determination of Size and Shape Characteristics by ASTM A 500

The dental gum pad was tested for fracture and shrinkage, which showed no increase or decrease in its shape and size after the experiment. There was no change in its shape and size as per ASTM A500. The results of this study are depicted in Table 4.

TABLE 4

Determination of size and shape characteristics of the dental gum pad

| Materials | Size and Shape | ASTM A 500 |
|---|---|---|
| Dental gum pad | No swell or shrink | Resistant Characters |
| Synthetic dental gum | No swell or shrink | |

Example 5: Firmness Test

No cracks were observed as per ASTM D5419, respectively. The results of this study are depicted in Table 5.

TABLE 5

Firmness test represented by bore and crack test.

| Materials | Crack test by ASTM D5419 |
|---|---|
| Dental gum pad | No crack symptom |
| Synthetic dental gum | No Crack symptom |

Example 6: Tensile Test

The tensile test was done by a Universal Test Machine for bioplastics as ASTM D5083. Results showed that the tensile strength was 94.5 MPa, and the tensile modulus was 1.7 GPa for the dental gum pad, which were compared with the synthetic dental gum standard given by ASTM D5083. The results of this study are depicted in Table 6.

TABLE 6

Determination of tensile test by ASTM D5083

| Materials | Tensile strength (MPa/kg · m$^3$) | Tensile Modulus (GPa) |
|---|---|---|
| Dental gum pad | 94.5 | 1.7 |
| Synthetic dental gum | 70 to 230 (ASTM) | 1.0 to 3.0 (ASTM) |

Example 7: Melting Point

The hot water (heating) resistance and melting points are adhered to the standard. The odor, hot water heating, and melting point tests were conducted according to ASTM standards.

TABLE 7

Determination of melting point and heating point test by ASTM D5083

| Materials | Melting Point (° C.) | Hot water resistance at 150 (° C.) for 3 h |
|---|---|---|
| Dental gum pad | 180° C. | Color and shape are unchanged |
| Synthetic dental gum | 160 to 210° C. | Color and shape are unchanged |

Example 8: Chemical Element Test

Chemical element tests, such as Na, K, $CO_3^-$, Cl, Ca, Si, Fe, Pb, Cu, Al, Sn, and Zn, were determined using the EN (166) [European Norm, 166] standardization. Similar results were obtained comparable to the synthetic dental gums. The results of this study are depicted in Table 8.

TABLE 8

Determination of Chemical Element
Test by EN (European Standard EN166))

| Chemical elements (ppm) | Dental gum pad | Synthetic dental gum |
|---|---|---|
| K | 8.5 ± 0.4[b] | 10 |
| Na | 4.5 ± 0.3[bc] | 5 |
| Cl | 0.50 ± 0.02[d] | 2 |
| $CO_3$ | 165 ± 1.0[a] | 440.5 |
| Ca | 8.0 ± 0.02[a] | 10 |
| Si | 2.5 | 5 |
| Fe | 1.6 | 5 |
| Pb | 0 | 5 |
| Cu | 0.5 | 5 |
| Al | 1.3 | 5 |
| Sn | 1.4 | 5 |
| Zn | 0.8 | 5 |

Mean ± standard error (SE, n = 3). Different letters mean the significant difference at a 5% level of significance by LSD test.

Numerous modifications and variations of the present disclosure are possible in light of the above teachings. It is, therefore, to be understood that within the scope of the appended claims, the invention may be practiced otherwise than as specifically described herein.

The invention claimed is:

1. An organic dental gum pad formed from a moldable composition comprising:
   a nanostarch-based biomaterial comprising a nanocomponent, a starch biocomposite, and an organic composition;
   at least one polymer component selected from the group consisting of a polymethyl methacrylate (PMMA), a polylactic glycolic acid (PLGA), and a silicone; and
   a cyanoacrylate,
   wherein the nanocomponent comprises fish bone powder, oyster shell powder, coconut shell powder, graphene, and sheep bone powder,
   wherein the starch biocomposite comprises date seed nanoparticles, black palm seed coat nanoparticles, corn starch nanoparticles, and olive seed nanoparticles,
   wherein the organic composition comprises at least one of *Lannea* sp. glue, waste jackfruit latex, *Acacia nilotica* glue, a sheep gut oil-based glycerin, beetroot peel dye, dragon fruit peel dye, mangosteen dye, pomegranate peel, and aroid peel gel,
   wherein the moldable composition comprises particles having an average particle size of less than 30 nm, and
   wherein the organic dental gum pad has a molded structure having a thickness of 0.5 to 4 mm.

2. The dental gum pad of claim 1, wherein the molded structure comprises a plurality of periodontal pockets arranged along a perimeter of the molded structure, the pockets having a depth of 1 to 3 mm.

3. The dental gum pad of claim 1, wherein the at least one polymer component is present in an amount of 4 to 20 wt. % and the cyanoacrylate is present in an amount of from 1 to 10 wt. % based on the total weight of the moldable composition.

4. The dental gum pad of claim 1, wherein the moldable composition has a tensile strength of 75 to 115 mPa/kg·m³.

5. The dental gum pad of claim 1, wherein the at least one polymer component is present in an amount of 4 wt. % based on the total weight of the moldable composition.

6. The dental gum pad of claim 1, wherein the organic composition is present in an amount of 10 to 30 wt. % based on the total weight of the moldable composition.

7. The dental gum pad of claim 1, wherein the moldable composition comprises the beetroot peel dye and the dragon fruit peel dye in a total amount of 1 to 20 wt. % based on the total weight of the moldable composition.

8. The dental gum pad of claim 1, wherein the moldable composition has a tensile modulus of 0.5 to 3 GPa.

9. The dental gum pad of claim 1, wherein the organic composition is present in an amount of 16 to 23 wt. % based on the total weight of the moldable composition.

10. The dental gum pad of claim 1, wherein the moldable composition comprises particles having an average particle size of less than 20 nm.

11. The dental gum pad of claim 1, wherein the molded structure has a thickness of 1.5 to 3 mm.

12. The dental gum pad of claim 1, wherein the moldable composition has a tensile strength of 90 to 100 mPa/kg·m³.

13. The dental gum pad of claim 1, wherein the moldable composition has a tensile modulus of 1.5 to 2 GPa.

* * * * *